US008191111B2

(12) United States Patent
Nakajima

(10) Patent No.: US 8,191,111 B2
(45) Date of Patent: May 29, 2012

(54) IMAGE FORMING SYSTEM AND IMAGE FORMING APPARATUS

(75) Inventor: Kouki Nakajima, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 717 days.

(21) Appl. No.: 12/349,788

(22) Filed: Jan. 7, 2009

(65) Prior Publication Data

US 2009/0260063 A1    Oct. 15, 2009

(30) Foreign Application Priority Data

Apr. 10, 2008  (JP) .................................. 2008-102073

(51) Int. Cl.
*H04L 29/06* (2006.01)
(52) U.S. Cl. ............................................. 726/3; 380/51
(58) Field of Classification Search ...................... 380/51
See application file for complete search history.

(56) References Cited

U.S. PATENT DOCUMENTS

| 5,606,609 A * | 2/1997 | Houser et al. ................. 713/179 |
| 2006/0044607 A1 | 3/2006 | Kato |
| 2006/0064597 A1 * | 3/2006 | Hatano ......................... 713/179 |
| 2006/0212497 A1 | 9/2006 | Tomita |
| 2007/0127051 A1 * | 6/2007 | Sakayama et al. ........... 358/1.14 |
| 2007/0250714 A1 * | 10/2007 | Kawada ........................ 713/175 |
| 2008/0005781 A1 * | 1/2008 | Koga ............................... 726/2 |

FOREIGN PATENT DOCUMENTS

| JP | 2005039411 | 2/2005 |
| JP | 2005096381 | 4/2005 |
| JP | 200699741 | 4/2006 |
| JP | 2006217350 | 8/2006 |

OTHER PUBLICATIONS

Japanese Office Action dated Mar. 27, 2012—3 pages.

* cited by examiner

*Primary Examiner* — Matthew Smithers
(74) *Attorney, Agent, or Firm* — K&L Gates LLP

(57) ABSTRACT

An image forming system includes: an authentication server device having user information, for performing a user authentication via a computer network; and an image forming apparatus including: an authentication unit for accessing the authentication server device to perform an authentication processing for a user; and a data storage device for storing therein document data generated by an image forming processing based on the user's operation, and storing document attribute information, which has the same attribute items as a part of, or all of, attribute items of the user information held by the authentication server device, in association with the document data.

14 Claims, 4 Drawing Sheets

[FIG. 1]
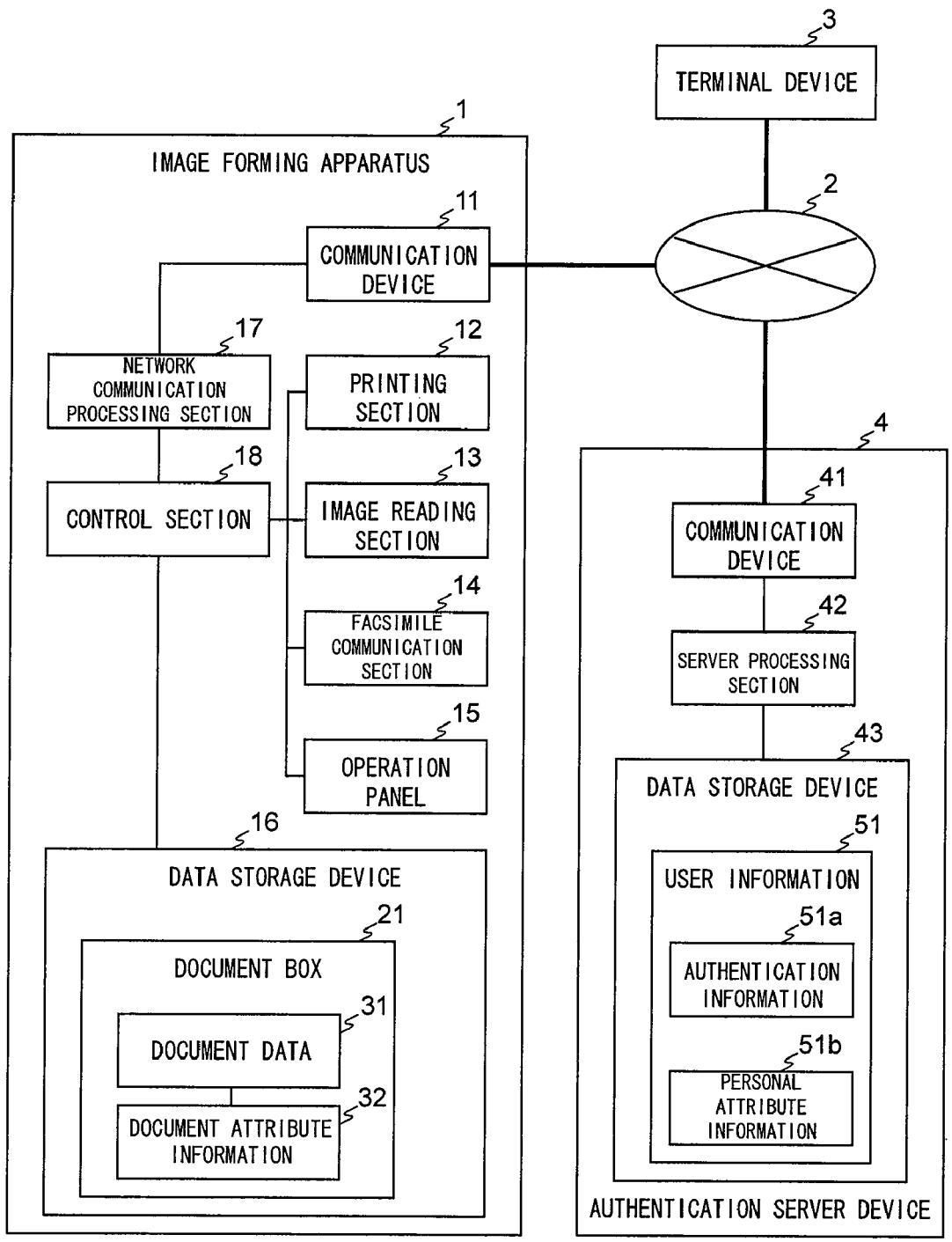

[FIG. 2]
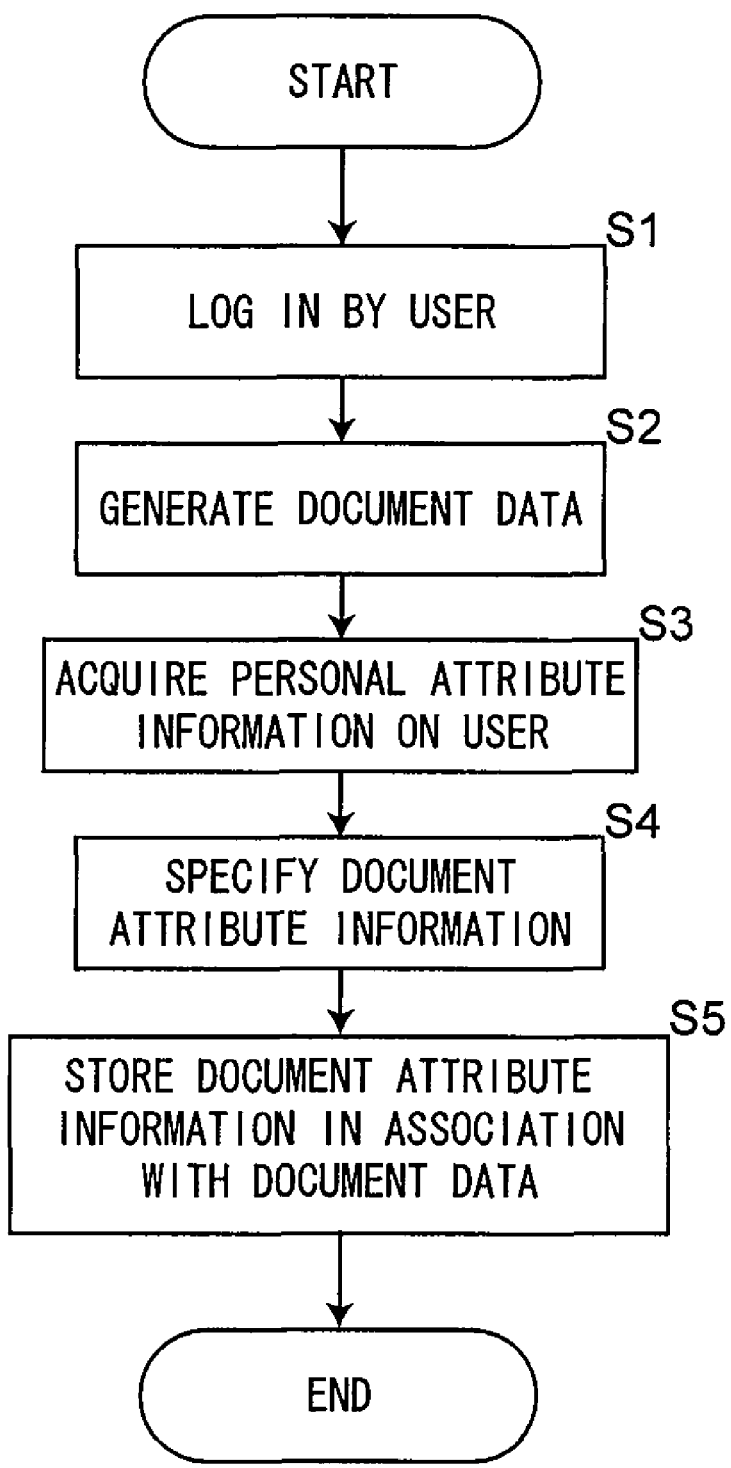

[FIG. 3]
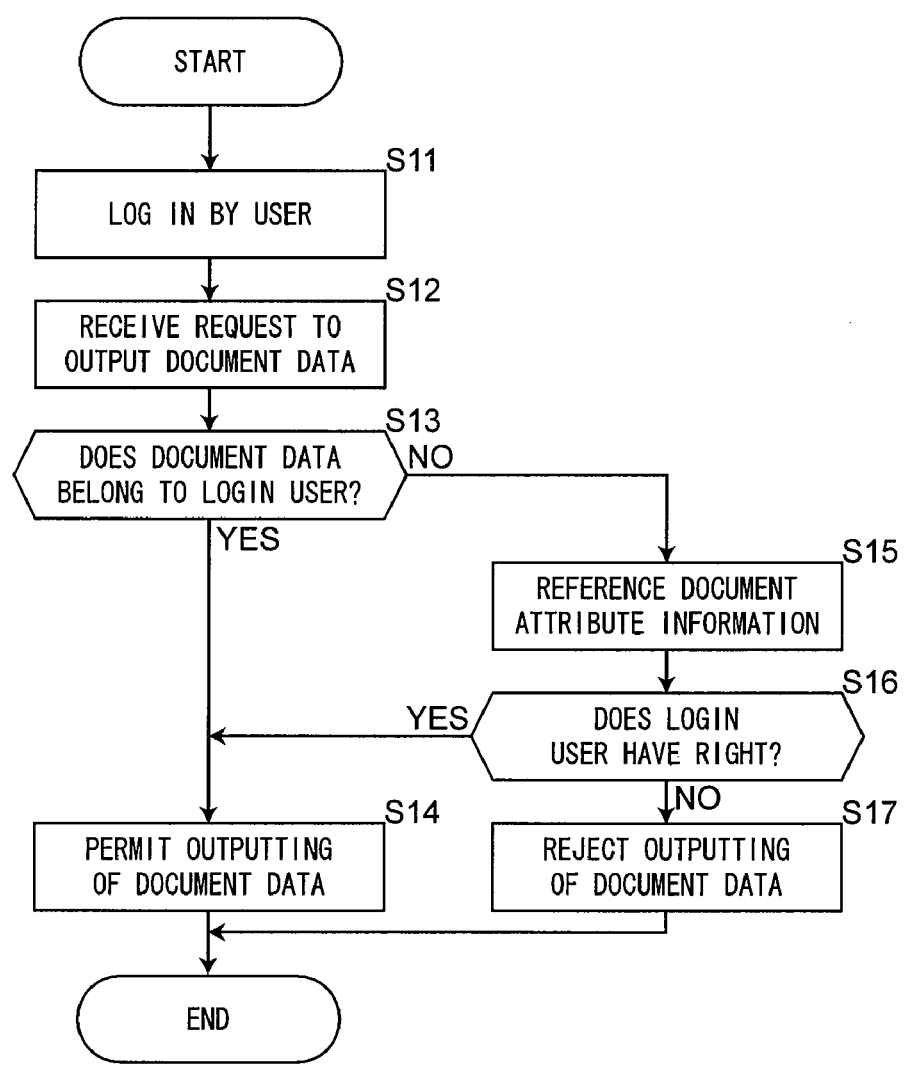

[FIG. 4]
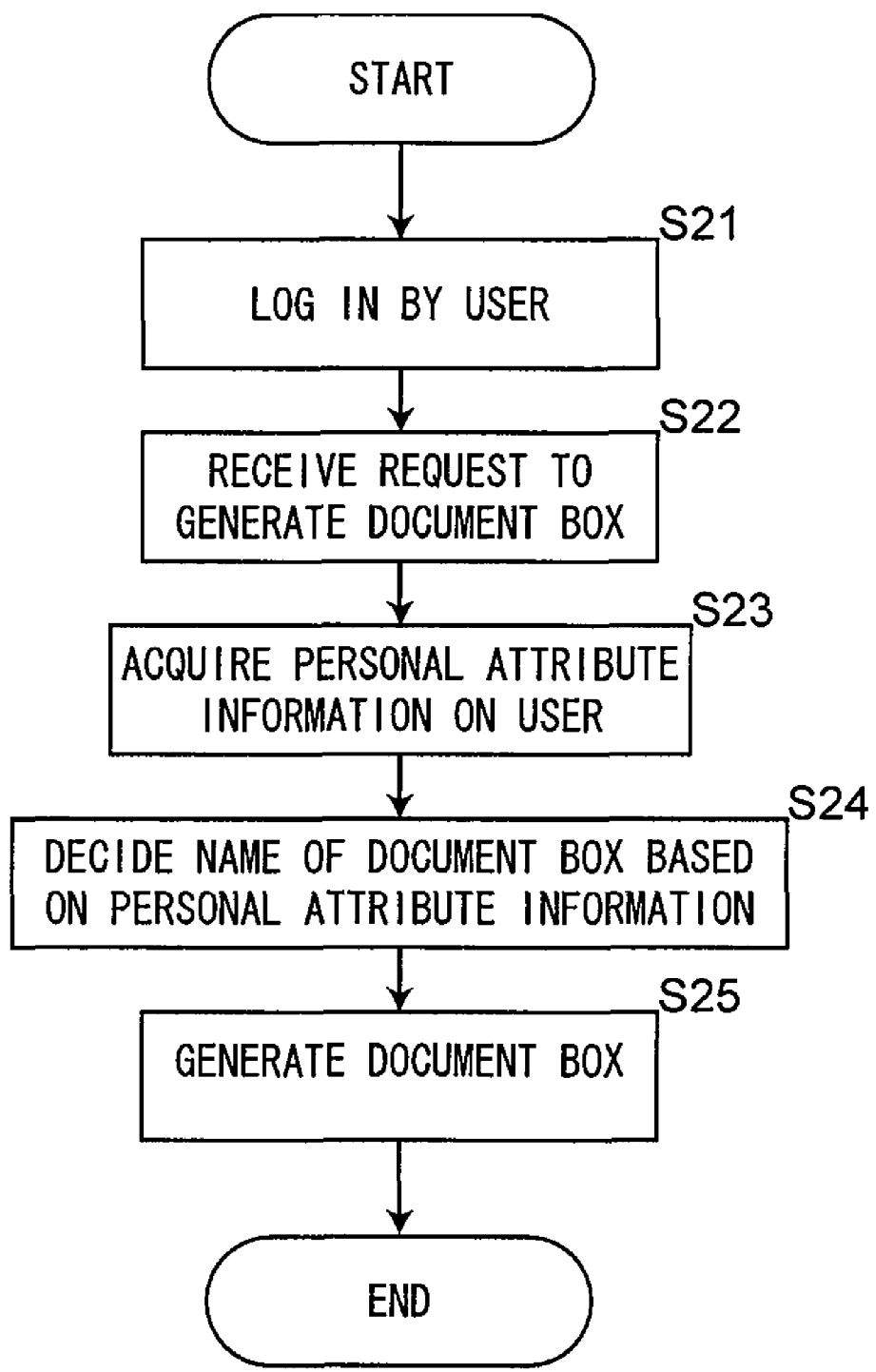

IMAGE FORMING SYSTEM AND IMAGE FORMING APPARATUS

INCORPORATION BY REFERENCE

This application is based upon and claims the benefit of priority from the corresponding Japanese Patent Application No. 2008-102073, filed Apr. 10, 2008, the entire contents of which is incorporated herein by reference.

BACKGROUND

1. Field of the Invention

The present invention relates to image forming systems and image forming apparatus.

2. Description of the Related Art

It is known to provide an image forming apparatus wherein document data is managed by being stored in a storage area called a "document box". In such image forming apparatus, access to the document data within the document box can be regulated.

More recently, image forming apparatus are often used within a computer network. In some computer networks wherein a plurality of users use a plurality of terminal devices are provided with an authentication server is provided for performing a user authentication. The authentication server includes user information that is registered in advance, and conducts an authentication process for a user who operates the terminal device based on the user information.

In the case of an image forming apparatus connected to a computer network, the user can use the terminal device to access the image forming apparatus via the computer network. Therefore, if it is not necessary to control access to the data, the user can merely operate the terminal device to gain access to the document box.

In those situations where it is desirable to limit access, limitations can be placed on the accessibility based on security settings held by the image forming apparatus.

Therefore, even a user registered on the authentication server in the computer network will need to perform an additional operation step, such as inputting a password, in order to be permitted to access the document data within the document box based on the security settings of the image forming apparatus.

In addition, where it is necessary to access the document data of another user, permission for access to the other user's data needs to be set in advance in the image forming apparatus. Such settings are necessary in each image forming apparatus that is required to perform shared settings with the other user.

Accordingly, it is necessary for various settings to be individually performed in the image forming apparatus. This reduces the usability of the apparatus for the users.

SUMMARY

The present invention provides an image forming apparatus capable of improving usability for a user. To this end, the present invention utilizes the user information held by an authentication server. In addition, the present invention provides improved image forming systems including the image forming apparatus.

Accordingly, in an embodiment of the present invention, there is provided an image forming system comprising: an authentication server device having user information, for performing a user authentication via a computer network; and an image forming apparatus including: an authentication unit for accessing the authentication server device to perform an authentication processing for a user; and a data storage device for storing therein document data generated by an image forming processing based on the user's operation and storing document attribute information, which has the same attribute items as a part of, or all of, attribute items of the user information held by the authentication server device, in association with the document data.

According to an another embodiment of the present invention, there is provided an image forming apparatus comprising: an authentication unit for accessing an authentication server to perform an authentication processing for a user; and a data storage device for storing therein document data generated by an image forming processing based on the user's operation and storing document attribute information, which has the same attribute items as a part of, or all of, attribute items of user information held by the authentication server, in association with the document data.

According to yet another embodiment of the present invention, the image forming apparatus further comprises: a network communication processing unit that can be connected to a computer network; an attribute information acquisition unit for acquiring a part of, or all of, the user information from the authentication server, and storing the acquired user information into the data storage device as the document attribute information in association with the document data; and an access control unit for controlling access to the document data based on the document attribute information. The attribute information acquisition unit uses the network communication processing unit to acquire user information from the authentication server. The authentication unit performs the authentication processing for a user accessing the computer network from a terminal device, via the network communication processing unit. The access control unit controls access to the document data based on the document attribute information.

Additional features and advantages are described herein, and will be apparent from the following Detailed Description and the figures.

BRIEF DESCRIPTION OF THE FIGURES

In the accompanying drawings:

FIG. 1 is a block diagram illustrating a configuration of an image forming system according to an embodiment of the present invention;

FIG. 2 is a flowchart for explaining box saving performed by the image forming apparatus illustrated in FIG. 1;

FIG. 3 is a flowchart for explaining box outputting performed by the image forming apparatus illustrated in FIG. 1; and FIG. 4 is a flowchart for explaining box creating performed by the image forming apparatus illustrated in FIG. 1.

DETAILED DESCRIPTION

Hereinafter, description is made of an embodiment of the present invention based on the accompanying drawings.

FIG. 1 is a block diagram illustrating a configuration of an image forming system according to an embodiment of the present invention.

In the image forming system illustrated in FIG. 1, an image forming apparatus 1 is connected to a computer network 2. The image forming apparatus 1 can be used by a user who operates a terminal device 3 connected to the computer network 2 or an operation panel 15 of the image forming apparatus 1. The user, who uses the image forming apparatus 1, undergoes a user authentication performed by an authentication server device 4. The authentication server device 4 includes user information 51 with respect to authorized users registered thereon. The authentication server device 4 uses the authentication information 51a to verify an authorized user. The image forming apparatus 1 includes a communication device 11, a printing section 12, an image reading section 13, a facsimile communication section 14, the operation panel 15, a data storage device 16, a network communication processing section 17, and a control section 18.

The communication device 11 represents a device that is connected to the computer network 2 and is capable of communicating with other devices (such as the terminal device 3 or the authentication server device 4) connected to the computer network 2. A network interface card or the like can be used as the communication device 11.

The printing section 12 represents a device for printing a document image based on document data that is generated by the image reading section 13 or document data 31 stored in a document box 21. Note that the document data represents image data having a predetermined format.

The image reading section 13 represents a device, such as a scanner, for irradiating light onto one side or both sides of an original fed by an automatic document feeder (ADF) or the original can be placed by the user on the device. The device receives reflected light thereof to read an image of the original, and outputs the image of the original as document data.

The facsimile communication section 14 represents a device including a modem, for generating a facsimile signal from the document data generated by the image reading section 13 or the document data 31 stored in the document box 21. The device transmits the facsimile signal via a telephone line or the like. Likewise, the device can receive a facsimile signal and generate document data from the received facsimile signal.

The operation panel 15 represents a user interface device including a display device such as a liquid crystal display and an input device for electrically detecting a user's physical operation. The input device can be a key switch, a transparent touch panel disposed on a screen of the display device, or the like.

The data storage device 16 represents a device for storing therein the document data generated by the image reading section 13 or the facsimile communication section 14, the document data to be supplied to the printing section 12 or the facsimile communication section 14, and other such data. The data storage device 16 can be a device for driving a readable/writable recording medium, such as a hard disk drive or a nonvolatile memory.

The data storage device 16 has a predetermined storage area secured as the document box 21. Document data 31 is stored within the document box 21. In addition, document attribute information 32 is stored in association with the document data 31. The document attribute information 32 has the same attribute items as a part of, or all of, attribute items of user information 51 held by the authentication server device 4. The document data 31 and the document attribute information 32 may be set as one file or may be different files.

The network communication processing section 17 represents a processing section for controlling the communication device 11 and performing data communications with a device connected to the computer network 2 by using a predetermined protocol. The control section 18 represents a processing section for controlling the printing section 12, the image reading section 13, the facsimile communication section 14, the operation panel 15, and the network communication processing section 17. The control section 18 can access the authentication server device 4 to conduct an authentication processing for a user. The control section 18 thereby acquires a part of, or all of, the user information 51 from the authentication server device 4 and stores the acquired personal attribute information 51b in the data storage device 16 as the document attribute information 32 in association with the document data 31. The control section 18 also controls access to the document data 31 based on the document attribute information 32. The network communication processing section 17 and the control section 18 can be implemented by, for example, executing computer programs on the computer. It should be noted that the network communication processing section 17 is an example of a network communication processing unit. Likewise, the control section 18 is an example of an authentication unit, an example of an attribute information acquisition unit, and an example of an access control unit.

The terminal device 3 represents an information processing device having a network function and an authentication client function using the same authentication protocol as used by the authentication server device 4. The authentication protocol can be Lightweight Directory Access Protocol (LDAP), Windows NT LAN Manager (NTLM), Kerberos, or the like. Examples of the terminal device 3 used herein include a personal computer.

The authentication server device 4 includes a communication device 41, a server processing section 42, and a data storage device 43.

The communication device 41 represents a device that is connected to the computer network 2 and is capable of communicating with other device (such as the image forming apparatus 1 or the terminal device 3) connected to the computer network 2. A network interface card or the like can be used as the communication device 41.

The server processing section 42 represents a processing section for receiving a user authentication request according to a predetermined authentication protocol, and determining whether or not to authenticate the user. The server processing section 42 can be implemented by, for example, one of the functions of a server OS (Operating System) such as Windows Server or Linux Server.

The data storage device 43 represents a device for storing therein the user information 51 corresponding to each of one or more authorized users. The data storage device 43 can be a device for driving a readable/writable recording medium, such as a hard disk drive or a disk array.

The user information 51 includes the authentication information 51a that is used for authenticating a user as well as the personal attribute information 51b on the user. The authentication information 51a includes attribute items, for example, a user ID and a password. The personal attribute information 51b represents information that is not used for authentication within the user information 51, and includes attribute items, for example, an electronic mail address, a group designation (such as a department or a division), and a user name (user name for display). Note that the user name represents text data that is set separately from the user ID.

A description of an embodiment of the operation of the image forming apparatus 1 and the image forming system will now be provided.

The image forming apparatus 1 has a document box function. The document box function includes the steps of (1) box saving, (2) box outputting, and (3) box creating.

Hereinafter, each of the processing steps is described.

(1) Box Saving

The box saving represents the step wherein the document data 31 that is generated within the image forming apparatus 1 and the document data 31 supplied from the terminal device 3 along with the document attribute information 32 is saved in the document box 21.

FIG. 2 is a flowchart for illustrating the box saving performed by the image forming apparatus illustrated in FIG. 1.

To this end, first, a user logs in to the image forming apparatus 1. The image forming apparatus 1 validates the user based on the authentication information inputted by the user, and permits only the valid user to log in (Step S1). At this time, the authentication information including the user ID is inputted by the user through the terminal device 3 or the operation panel 15, and supplied to the control section 18. Then, the control section 18 uses the network communication processing section 17 to access the authentication server device 4, and performs the authentication process with respect to the user. When the user is operating the terminal device 3, the user's operation is detected, and information such as a request based on the operation is transmitted to the image forming apparatus 1 via the computer network 2. On the image forming apparatus 1, the information is received by the network communication processing section 17, and supplied to the control section 18.

Note that the authentication information may have only include the user ID, and the authentication information may be stored in a recording medium within the terminal device 3, an IC card, or the like, and then read automatically therefrom without a user's input operation.

A user that is permitted to log in (hereinafter, referred to as "login user") can use the image forming apparatus 1. On the other hand, a user that is not allowed to log in cannot use the image forming apparatus 1.

Once the user has logged in, an image forming processing or the like can be performed by the image forming apparatus 1 according to a request based on the login user's operation, and the document data 31 is generated in course of the image forming processing (Step S2). The control section 18 then acquires the personal attribute information 51b on the login user from the authentication server device 4 (Step S3). At this time, the control section 18 transmits, to the authentication server device 4, a request for causing values of one or more predetermined attribute items of the personal attribute information 51b with respect to the user to be transmitted, via the network communication processing section 17. Then, upon receipt of the request, the server processing section 42 of the authentication server device 4 reads the personal attribute information 51b specified by the request from the data storage device 43, and transmits the personal attribute information 51b to the image forming apparatus 1 as a request source.

The control section 18 can then set the acquired personal attribute information 51b as the document attribute information 32 (Step S4), and store the document attribute information 32 into the data storage device 16 in association with the document data 31 (Step S5).

The box saving is thus executed.

(2) Box Outputting

The box outputting step represents outputting the document data 31 within the document box 21. Examples of the box outputting include box printing and box transmission. In the box printing, the printing section 12 is set as an output destination, and an original image is printed based on the document data 31. In the box transmission, the network communication processing section 17 (and the communication device 11) or the facsimile communication section 14 is set as an output destination. Output image data based on the document data 31 is transmitted to the output destination based on a predetermined communication protocol such as electronic mail, File Transfer Protocol (FTP), or facsimile transmission.

FIG. 3 is a flowchart illustrating the box outputting performed by the image forming apparatus 1 illustrated in FIG. 1.

Note that in this embodiment, the document attribute information 32 contains group designation information within the personal attribute information 51b of the authentication server device 4.

First, a user logs in to the image forming apparatus 1. The image forming apparatus 1 executes a login processing in the same manner as Step S1 described above (Step S11).

Subsequently, the user through operation of the terminal device 3 or the operation panel 15, can generate in the control section 18 (Step S12) a box outputting request. When the box outputting request is generated, a list of the document box 21 is displayed on the terminal device 3 or the operation panel 15, and any one of the document box 21 is specified by the user's operation. Then, the list of items of the document data 31 within the specified document box is displayed on the terminal device 3 or the operation panel 15, and any one of the displayed document data 31 can be specified by the user. The document data for the box outputting is thus specified.

Subsequently, the control section 18 identifies owner information with respect to the specified document box or the specified document data to determine whether or not the specified document data belongs to the login user (Step S13).

If the specified document data belongs to the login user, the control section 18 permits and executes the box outputting of the document data 31 (Step S14).

On the other hand, if the specified document data does not belong to the login user, the control section 18 references the document attribute information 32 of the specified document data to acquire the group designation information of the document attribute information 32 (Step S15).

Then, the control section 18 uses the network communication processing section 17 to acquire the group designation information with respect to the login user from the authentication server device 4. Subsequently, based on both the group designation information of the document attribute information 32 and the group designation information on the login user, the control section 18 determines whether or not the login user has a right to access the requested box outputting according to a predetermined security policy (Step S16). Note that the security policy can be previously stored in the image forming apparatus 1.

If the control section 18 determines that the login user has a right to access the requested box outputting, the control section 18 permits and executes the box outputting of the specified document data (Step S14). On the other hand, if the control section 18 determines that the login user does not have the right to access the requested box outputting, the control section 18 rejects the box outputting of the specified document data (Step S17). At this time, the control section 18 displays an image or the like that indicates that the box outputting has been rejected on the terminal device 3 or the operation panel 15, and ends the box outputting processing.

The box outputting is thus executed.

(3) Box Creating

The box creating step represents a process of generating a new document box 21 for a user.

FIG. 4 is a flowchart illustrating the box creating performed by the image forming apparatus 1 illustrated in FIG. 1.

First, the user logs in to the image forming apparatus 1. The image forming apparatus 1 executes a login processing in the same manner as Step S1 described above (Step S21).

Subsequently, the user, through the terminal device 3 or the operation panel 15, generates in the control section 18 (Step S22) a box creating request.

When the box creating request is generated, the control section 18 acquires a predetermined item of the personal attribute information 51b with respect to the login user from the authentication server device 4 (Step S23). Then, the control section 18 generates a name of the document box 21 from the acquired personal attribute information 51b (Step S24). At this time, for example, if the user name is acquired from the personal attribute information 51b, the user name is used as the name of the document box 21. Alternatively, if the group designation and the user name are acquired from the personal attribute information 51b, for example, a text obtained by coupling the group designation and the user name then can be used as the name of the document box 21.

Then, the control section 18 generates the document box 21 associated with the attribute information containing the name of the document box 21, in the data storage device 16 (Step S25).

The box creating is thus executed.

As has been described above, according to this embodiment, the authentication server device 4 has the user information 51, and performs the user authentication via the computer network 2. The image forming apparatus 1 includes the control section 18 for accessing the authentication server device 4 so as to perform the authentication processing for the user. The image forming apparatus 1 further includes the data storage device 16 for storing therein the document data 31 generated by the image forming processing based on the login user's operation. The data storage device 16 stores the document attribute information 32, which has the same attribute items as a part of, or all of, attribute items of the user information 51 held by the authentication server device 4, in association with the document data 31.

Accordingly, data structure of the document attribute information added to the document data within the image forming apparatus 1 becomes the same as a part of, or all of, attribute items of the user information 51 within the authentication server device 4. Therefore, the user information 51 within the authentication server device 4 can also be used within the image forming apparatus 1, thereby improving the usability for the user.

Note that although the above-mentioned embodiment represents an example of the present invention, the present invention is not limited thereto, and various modifications and changes can be made thereto within the scope of the invention.

For example, in the box outputting of the above-mentioned embodiment, security policies may be used for each group to permit one to only view the document data 31 or permit only the outputting from a specific box. Further, the group may form a hierarchical structure with other groups, and security policies may be set on a basis of groups in each tier.

Further, in the above-mentioned embodiment, all items of the user information 51 on the login user or all items of the personal attribute information 51b may be used as the document attribute information 32.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image forming system, comprising:
   an authentication server device having user information, configured to perform a user authentication via a computer network; and
   an image forming apparatus comprising:
   an authentication unit configured to access the authentication server device to perform an authentication processing for a login user;
   a data storage device configured to store document data generated by an image forming processing based on a user's operation, and to store document attribute information, which has the same attribute items as a part of, or all of, attribute items of the user information held by the authentication server device, in association with the document data; and
   a control section configured to acquire the user information from the authentication server device, and to determine whether or not the login user has a right to access the document data in the data storage device according to a predetermined security policy based on both the document attribute information in the data storage device and the user information acquired from the authentication server device.

2. The image forming system according to claim 1, wherein the authentication server device receives a user authentication request according to a predetermined authentication protocol.

3. The image forming system according to claim 2, wherein the predetermined authentication protocol is selected from the group consisting of Lightweight Directory Access Protocol (LDAP), Windows NT LAN Manager (NTLM), and Kerberos.

4. An image forming apparatus, comprising:
   an authentication unit configured to access an authentication server for authenticating a login user via a computer network;
   a data storage device configured to store document data generated by an image forming processing based on a user's operation, and to store document attribute information, which has the same attribute items as a part of, or all of, attribute items of user information held by the authentication server, in association with the document data; and
   a control section configured to acquire the user information from the authentication server device, and to determine whether or not the login user has a right to access the document data in the data storage device according to a predetermined security policy based on both the document attribute information in the data storage device and the user information acquired from the authentication server device.

5. The image forming apparatus according to claim 4, wherein the document data and the document attribute information are stored in the data storage device as one file.

6. The image forming apparatus according to claim 4, wherein the document data and the document attribute information are stored in the data storage device as different files.

7. The image forming apparatus according to claim 4, wherein the document data is stored in a document box assigned to a predetermined storage area of the data storage device, and the data storage device stores the document attribute information regarding the document box.

8. The image forming apparatus according to claim 7, wherein the data storage device stores a name generated from a value of at least one item of the user information, as the document attribute information regarding the document box.

9. The image forming apparatus according to claim 4, wherein the user information includes user authentication information and user personal attribute information.

10. The image forming apparatus according to claim 9, wherein the user authentication information is selected from the group consisting of a user ID and a password.

11. The image forming apparatus according to claim 9, wherein the user personal attribute information is not used for the user authentication and is selected from the group consisting of an electronic-mail address, a group designation, and a user name.

12. The image forming apparatus according to claim 4, further comprising:
   a network communication processing unit configured to be connected to the computer network; and wherein
   the authentication unit is further configured to perform authentication processing for the login user on a terminal device within the computer network, via the network communication processing unit; and
   the control section is further configured to control access made from the login user on the terminal device to the document data based on both the document attribute information and the user information acquired from the authentication server device.

13. The image forming apparatus according to claim 12, wherein:
   the user information and the document attribute information include a group designation as an item; and
   the control section is further configured to permit access to the document data associated with the document attribute information only in a case where the login user belongs to the group designations set in the document attribute information.

14. The image forming apparatus according to claim 13, wherein the group designations forms a hierarchical structure with other group designations, and the access to the document data is controlled on a basis of belonging groups in each tier.

* * * * *